UNITED STATES PATENT OFFICE.

RICHARD J. BRICE, OF BROOKLYN, NEW YORK, ASSIGNOR OF ONE-HALF TO DANIEL CULHANE, OF SAME PLACE.

PROCESS OF UTILIZING GALVANIZED WASTE.

SPECIFICATION forming part of Letters Patent No. 448,600, dated March 17, 1891.

Application filed April 1, 1890. Serial No. 346,224. (No specimens.)

*To all whom it may concern:*

Be it known that I, RICHARD J. BRICE, a subject of the Queen of Great Britain and Ireland, now a resident of Brooklyn, in the county of Kings and State of New York, have invented a certain new and useful Process of Utilizing Galvanizers' Waste, of which the following is a specification.

Galvanizers' waste consists of two quite different products, one more technically known as "sal-ammoniac skimmings" and the other as "zinc-ashes." As is well known, the first product is secured by skimming the top of the galvanizing-bath when it is covered with sal-ammoniac, while the second, though usually containing a very small percentage of sal-ammoniac, is obtained by skimming the surface of the melted zinc when the sal-ammoniac has been practically swept back or skimmed off, or by skimming off the surface of scrap-zinc while that is being melted alone. Oxidation produces both substances, but they are quite different in their constituent parts. If immediately run into casks, as they are by careful galvanizers, the sal-ammoniac skimmings may be very readily and economically treated by the process I am about to describe; but if thrown about anyhow and anywhere they are sometimes so affected by the exposure as to need a preliminary pulverization, and though this same process may be then employed it is not of so much benefit, as the expense and difficulty of pulverizing are not thereby avoided. I have heretofore discovered a method of treating the waste if it must be first pulverized; but, as stated, the present process is especially useful in treating the carefully-preserved waste without a preliminary pulverizing.

As the waste comes from the galvanizer the zinc, ammonia, and chloride it contains are so united as to be of little value, and to separate these elements or some of them and so treat them as to render them of use is the object of my process, it being premised that to be a practical success such process must be inexpensive, and in this respect the present far exceeds all previous methods. In practicing it I proceed as follows:

First. I take the sal-ammoniac skimmings, and placing it in a suitable vessel, preferably an iron pot, subject it to heat until it is in a state of fusion, which usually takes place at about 500° Fahrenheit. The metallic zinc will settle to the bottom and may be drawn off thence through an aperture in the lower part of the vessel, suitably located, and alone or together with the metallic zinc screened out of the ashes, as hereinafter set forth, may be run into ingots, forming a good quality of spelter. During the fusion of the waste I have prepared a tank of water heated to about 212° Fahrenheit, the quantity of water being about thirty gallons for each one hundred pounds of the material.

Second. I gradually add the waste, now in a state of fusion, to the heated water, which is preferably well stirred during the operation. I find that by so doing the particles of waste will be and remain so disintegrated as to readily pass through an eighty-mesh sieve and to be easily acted upon by any subsequently-added agent much more fully than would be possible had said agent been added during the fusion or had the water been added before fusion, and it is in this relative arrangement of steps that the main feature of my invention consists. To the mass thus disintegrated I add lime, in the form of milk of lime, to precipitate the zinc, using of quicklime a quantity about twenty per cent. in weight of the raw skimmings under treatment, the water in which the lime is dissolved being sufficient in quantity and temperature to reduce the temperature of the mass to about 120° Fahrenheit, which permits and assists the precipitation, giving practically two products, chloride of calcium in solution and an oxychloride of zinc as a precipitate. If the ammonia is of moment, the first is drawn off and the ammonia recovered from it by adding a little slaked lime (about five per cent.) and then distilling off the ammonia in the ordinary way. The precipitate is now in condition to be used as a pigment, provided excess of moisture is driven off, which may be done by filter-pressing or by furnacing, the former being preferable, as by it more of the chloride of calcium is also driven off, leaving the proportion thereof a little less than it otherwise would be. To the second (the precipitate) I add a quantity of zinc-ashes, (or practically oxide of zinc,) about one hundred per cent. in weight of the quantity of the skimmings originally treated, first screening out from the ashes the rough particles of metallic zinc. These particles, as above noted, may be, with or without the metallic zinc of the sal-ammoniac skimmings, placed in a sweating-furnace, run into ingots, and used as spelter. The mass of the precipitate and the zinc-ashes, now in a thick paste, is then dried, (pulverized also, if desired,) when it may be ground in oil and forms an excellent paint, or, after being pulverized, (a cyclone-pulverizer is useful for this purpose,) it may be calcined at a moderate heat, becoming much lighter in color.

If the product is to be used as a pigment, it is not always necessary to run off the chloride-of-calcium solution, as above stated, but to the entire mass the ashes may be added, varying the proportion in such case to about two-thirds ashes to one-third sal-ammoniac skimmings, the additional lime therein in no way injuring the product for the use named, and if the resulting moisture therein is more than about ten per cent. the excess above that may be driven off by furnacing or filter-pressing, as may be found most convenient. This product is practically an oxychloride of zinc, for, as will be remembered, the elements necessary for the formation of such product have not been removed. Its use as a pigment is, I believe, new with myself, and, either ground in oils or mixed with colors, it forms a paint of more than ordinary body and durability, having excellent covering and drying qualities.

What I claim as my invention, and desire to secure by Letters Patent, is—

1. The process of treating sal-ammoniac skimmings, which consists in fusing them and gradually adding the fused mass to a quantity of water heated to about the boiling-point, substantially as set forth.

2. The process of treating sal-ammoniac skimmings, which consists in fusing them, separating the metallic zinc from the remaining portion of the fused mass, substantially as set forth, gradually adding said remaining portion to a quantity of water heated to about the boiling-point, precipitating the zinc by adding milk of lime, and separating the products by running off the solution, all substantially as set forth.

3. The process of treating sal-ammoniac skimmings, which consists in fusing them, separating the metallic zinc from the remaining portion of the fused mass, substantially as set forth, gradually adding said remaining portion to a quantity of water heated to about the boiling-point, precipitating the zinc by adding milk of lime, separating the products by running off the solution, and drying the precipitate, substantially as set forth.

4. The process of treating sal-ammoniac skimmings, which consists in fusing them, separating the metallic zinc from the remaining portion of the fused mass, substantially as set forth, gradually adding said remaining portion to a quantity of water heated to about the boiling-point, precipitating the zinc by adding milk of lime, adding zinc-ashes, and driving off excess of moisture, as set forth.

5. The process of treating sal-ammoniac skimmings, which consists in fusing them, separating the metallic zinc from the remaining portion of the fused mass, substantially as set forth, gradually adding said remaining portion to a quantity of water heated to about the boiling-point, precipitating the zinc by adding milk of lime, separating the products by running off the solution, adding zinc-ashes, as set forth, and drying, all substantially as described.

Signed at New York, in the county of New York and State of New York, this 20th day of March, A. D. 1890.

RICHARD J. BRICE.

Witnesses.
AGNES S. FALES,
A. G. N. VERMILYA.

It is hereby certified that Letters Patent No. 448,600, granted March 17, 1891, upon the application of Richard J. Brice, of Brooklyn, New York, for an improvement in "Process of Utilizing Galvanized Waste," were erroneously issued to said "Brice and Daniel Culhane," jointly, said Culhane appearing as owner of one-half interest in the patent; that said Letters Patent should have been issued to said *Richard J. Brice* as sole owner of said patent; also that the title of the invention in said Letters Patent was erroneously given as "Process of Utilizing Galvanized Waste" instead of *Process of Utilizing Galvanizers' Waste*; and that said Letters Patent should be read with these corrections therein that the same may conform to the record of the case in the Patent Office.

Signed, countersigned, and sealed this 28th day of April, A. D. 1891.

[SEAL.]

CYRUS BUSSEY,
*Assistant Secretary of the Interior.*

Countersigned:
C. E. MITCHELL,
*Commissioner of Patents.*